(12) United States Patent
Liu et al.

(10) Patent No.: US 7,941,826 B2
(45) Date of Patent: *May 10, 2011

(54) ENFORCING ACCESS CONTROL ON MULTICAST TRANSMISSIONS

(75) Inventors: Changming Liu, Cupertino, CA (US); Gregory M. Lebovitz, San Jose, CA (US); Purvi Desai, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/754,981

(22) Filed: Apr. 6, 2010

(65) Prior Publication Data

US 2010/0195529 A1    Aug. 5, 2010

Related U.S. Application Data

(63) Continuation of application No. 10/976,311, filed on Oct. 29, 2004, now Pat. No. 7,725,925.

(60) Provisional application No. 60/516,345, filed on Oct. 31, 2003.

(51) Int. Cl.
*H04L 9/00* (2006.01)
*H04L 9/32* (2006.01)
*G06F 7/04* (2006.01)

(52) U.S. Cl. ............ 726/3; 726/4; 726/5; 726/6; 726/7; 713/153; 713/154; 713/155; 713/156; 713/157

(58) Field of Classification Search ........................ 726/3
See application file for complete search history.

(56) References Cited

U.S. PATENT DOCUMENTS

| 7,206,841 | B2 * | 4/2007 | Traversat et al. | 709/225 |
| 2002/0126671 | A1 * | 9/2002 | Ellis et al. | 370/390 |

FOREIGN PATENT DOCUMENTS

| EP | 1 128 605 | 8/2001 |
| GB | 2 362 289 | 11/2001 |
| WO | WO 00/74312 | 12/2000 |

OTHER PUBLICATIONS

Co-pending U.S. Appl. No. 10/976,311, filed Oct. 29, 2004 entitled "Enforcing Access Control on Multicast Transmissions" by Changming Liu et al., 56 pages.
International Search Report for PCT/US2004/035734 mailed Mar. 17, 2005.

* cited by examiner

*Primary Examiner* — Longbit Chai
(74) *Attorney, Agent, or Firm* — Harrity & Harrity, LLP

(57) ABSTRACT

Systems, apparatus, methods, and computer program products for multicast access control are provided to analyze incoming data based on a source zone and a destination zone of the incoming data. Appropriate access control rules are applied to incoming data based on the results of the analysis. Additional implementations of a multicast access control include using a proxy rendezvous point operable to function as a rendezvous point in place of a physical rendezvous point.

23 Claims, 14 Drawing Sheets

ENFORCING ACCESS CONTROL ON MULTICAST TRANSMISSIONS

CROSS-REFERENCE TO RELATED APPLICATION

This application is a continuation of U.S. application Ser. No. 10/976,311, filed Oct. 29, 2004, which claims the benefit of prior U.S. provisional application 60/516,345, filed Oct. 31, 2003, the entirety of which are incorporated by reference herein.

BACKGROUND OF THE INVENTION

A. Field of the Invention

The present invention relates to secure network communications.

B. Description of Related Art

Network computing applications involving groups of computers may require simultaneous communication. There are three conventional ways to design a network application for simultaneous group communication: unicast, broadcast, and multicast. Conventional unicast systems require the transmission of a copy of each data packet to one specific recipient. In order to transmit to multiple recipients, a separate connection is made with each recipient. Making multiple direct connections requires a large amount of bandwidth as the number of recipients increases and may result in delays since the same packet must be repeatedly copied and then transmitted to each recipient. In a conventional broadcast system, one copy of each packet is sent to a broadcast address. The broadcast transmission is sent to a large number of people when only a small number actually wish or need to receive the broadcast.

With a conventional multicast system, a network application may send one copy of a packet or packets addressed toward a group of recipients instead of just one recipient as in unicast systems. A network or networks are then responsible for forwarding the packet(s) on toward the necessary recipients. Multicast typically uses a standardized range of destination Internet Protocol (IP) addresses (e.g., 224.0.0.0-239.255.255.255). A multicast source signals the rest of a network to a multicast transmission by setting the destination IP address for a packet within the range of multicast destination IP addresses. The multicast destination IP address used is the multicast group address.

Protocol Independent Multicast-Sparse Mode (PIM-SM) is a control paradigm for multicast transmission. In a PIM-SM system, a multicast recipient requests participation in a group transmission by signaling to a closest router, a "last-hop router," using the Internet Group Management Protocol (IGMP). The last-hop router uses PIM-SM to request the particular multicast stream from the next-hop routers. Therefore, under a PIM-SM system, multicast packets only go where requested. In order to draw the multicast from the source toward the last-hop router, a type of router, referred to here as a rendezvous point, may be necessary. This is because multicast sources and last-hop routers initially do not know of each other's presence. FIG. 1 illustrates an example of a conventional PIM-SM system including a rendezvous point 130. Referring to FIG. 1, multicast recipients 140a-140d (collectively, "140") may signal the last-hop routers that they would like a particular transmission. The last-hop routers 125a-125c (collectively "125") then send out a join request for multicast transmission to the rendezvous point 130 through intermediary routers 120. Different rendezvous points may exist for different multicast group transmissions. Last-hop routers 125 may determine which rendezvous point to send the join request to for a particular multicast transmission. Last-hop routers 125 make a connection to rendezvous point 130 for access to the source multicast stream instead of transmitting the join request directly to multicast source 110 when, for example, they do not know where the source is. The rendezvous point 130 receives the multicast transmission from multicast source 110 through first-hop router 115 and one or more intermediary nodes such as multicast routers 120, and distributes the multicast transmission toward all multicast recipients 140 subscribed to the multicast.

A conventional multicast router 120 is shown in FIG. 2. Multicast router 120 includes an interface 210 for receiving data, and access control list 220, a router 230 for determining the next path for data to follow in the network, and a forwarding module 240 for forwarding data to the next destination. Access control list 220 determines whether or not to allow access to the multicast router. Access control may be based on IP address information including the multicast group, the router the data came from, or a list of accepted users.

SUMMARY OF THE INVENTION

The present specification describes apparatuses, systems, methods, and computer program products for providing multicast access control.

According to one implementation consistent with principles of the invention, a multicast access control apparatus is provided. The apparatus may include an analyzer. The analyzer may be operable to analyze incoming data. The apparatus may includes a database including access control rules. The apparatus may include an access control engine operable to apply appropriate access control rules to incoming data based on the results of the analyzer.

According to another aspect of the present invention, a method is provided for performing multicast access control. The method includes receiving incoming data at a multicast access control apparatus. The incoming data may be analyzed. Access control rules may be applied to the incoming data.

According to yet another aspect of the present invention, a computer program product is provided for multicast access control. The computer program product includes instructions to receive incoming data at a multicast access control apparatus. The computer program product includes instructions to analyze the incoming data. The computer program product includes instructions to apply access control rules to the incoming data.

According to still another aspect of the present invention, a multicast access control system is provided. The multicast access control system includes a multicast source operable to provide a multicast transmission. A multicast access control apparatus is provided intersecting a plurality of zones. The multicast access control system includes a rendezvous point. The multicast access control system includes one or more multicast recipients.

According to still another aspect of the present invention, a multicast access control system is provided. The multicast access control system includes a multicast source operable to provide a multicast transmission. The multicast access control system includes a multicast access control apparatus including a proxy rendezvous point. The multicast access control system includes a rendezvous point operable to route the multicast transmission from the multicast source to a plurality of multicast recipients.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

The accompanying drawings, which are incorporated in and constitute a part of this specification, illustrate an implementation of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Figure 1:
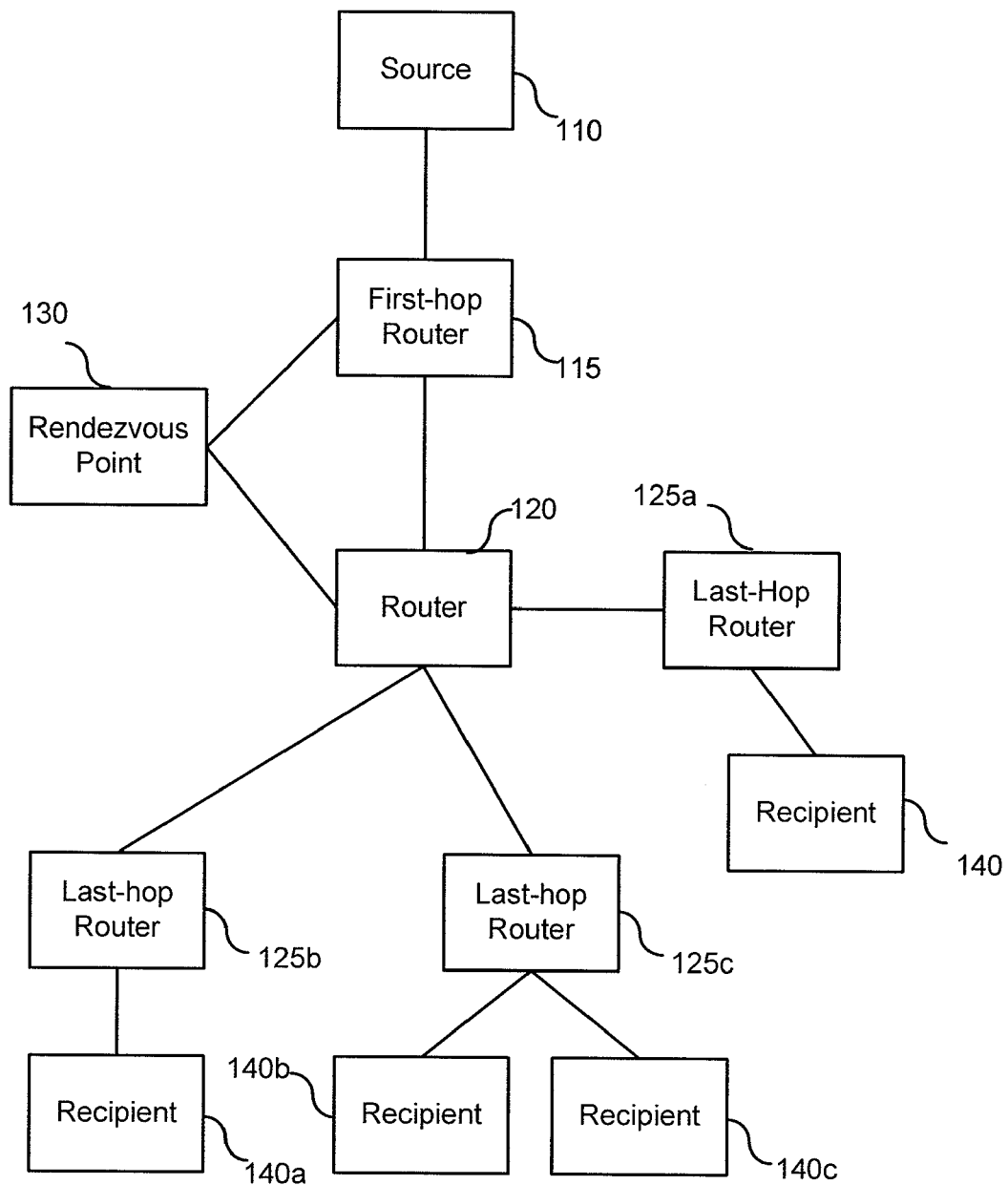
FIG. 1 is a schematic illustration of a conventional multicast system using a rendezvous point.
Figure 2:
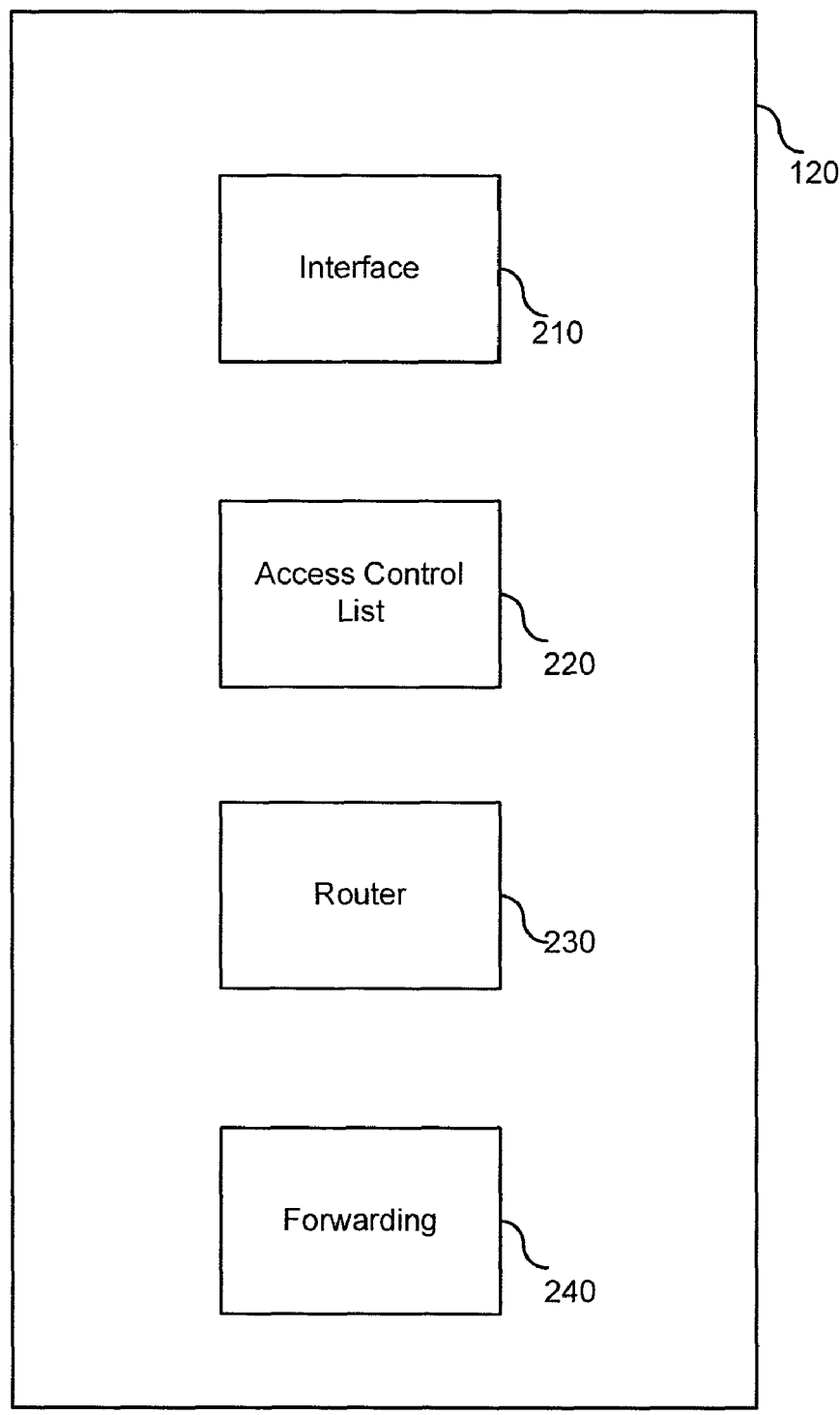
FIG. 2 is a schematic illustration of a conventional multicast router.
Figure 3:
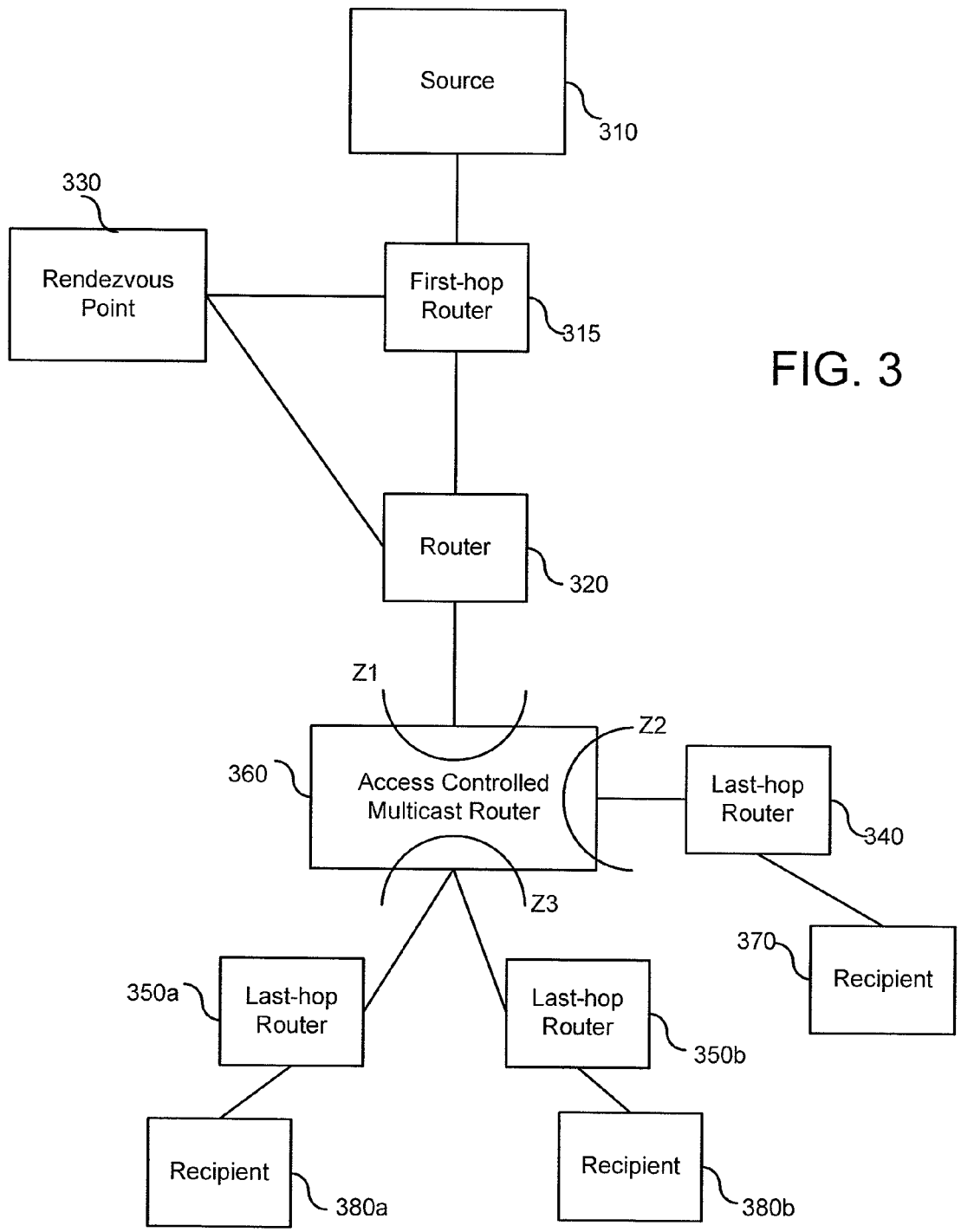
FIG. 3 is a schematic illustration of a multicast system using zone based access control.

FIG. 3 is a block diagram illustrating a multicast system configured in accordance with one implementation of the invention. The multicast system includes a multicast source 310 coupled to a rendezvous point 330 through one or more routers. A first-hop router 315 coupled to multicast source 310 may transmit a register message to rendezvous point 330 in order to create a path for a multicast transmission from multicast source 310 to rendezvous point 330. Rendezvous point 330 may then announce a multicast transmission to multicast recipients (e.g., multicast recipients 340 and 380a-380c (collectively, "380")). Last-hop routers 350a-350b (collectively, "350") may transmit a Protocol Independent Multicast (PIM) join request to rendezvous point 330 in order to receive the multicast transmission from multicast source 310 through rendezvous point 330. The PIM join message is transferred in the control plane. Signaling occurs and routing protocols are executed in the control plane. The control plane includes protocols such as PIM-SM that build up the data plane. The data plane, also called the forwarding plane, includes the actual transmission of data across a network. For example, when one of multicast last hop routers 350 transmits a PIM join message to rendezvous point 330 a path is built at the control plane level between rendezvous point 330 and that last hop router 350. The actual multicast transmission from rendezvous point 330 toward multicast recipient 380 occurs at the data plane over the path created at the control plane. Examples of control plane messages include PIM join requests and PIM PRUNE messages, unicast register messages, and boot strap router (BSR) announcements, which will be hereinafter referred to as multicast control announcements. Though the examples given in this application are for PIM and PIM-SM, any multicast routing protocol's control announcements may apply in a manner consistent with principles of the invention. Data plane messages include the actual content or media stream of a multicast transmission and will be hereinafter referred to as media transmissions.

Access controlled multicast router 360 provides an intersection between zones. A zone is a grouping of interfaces. A zone may represent an interface or collection of interfaces as well as the networks the interfaces serve. Interfaces may be physical, for example physical interface el.1, or they may be logical, for example logical interface el.1 as a VLAN tagged sub-interface on physical interface el.1 but in a different Virtual Local Area Network or a virtual system, and may be part of a different zone. Zones may be predefined or may be created based on input. Additionally, zones may be defined based on members of a multicast group. Members of a multicast group may be in a same zone even if they are not in geographic or logical proximity to each other. As illustrated in FIG. 3, source 310 and rendezvous point 330 are located within zone 1 (Z1). A last-hop router 340 and a multicast recipient 370 are located within zone 2 (Z2), while last-hop routers 350a and 350b and recipients 380a and 380b are located within zone 3 (Z3). As a result, a media transmission from multicast source 310 to the multicast recipients, for example the multicast recipients 380a-380b, must pass from zone 1 to zone 3. Alternatively, a media transmission from multicast source 310 to the multicast recipient 370 must pass from zone 1 to zone 2. Access controlled multicast router 360 provides access controls for messages crossing zones at both the control plane and the data plane.

Figure 4:
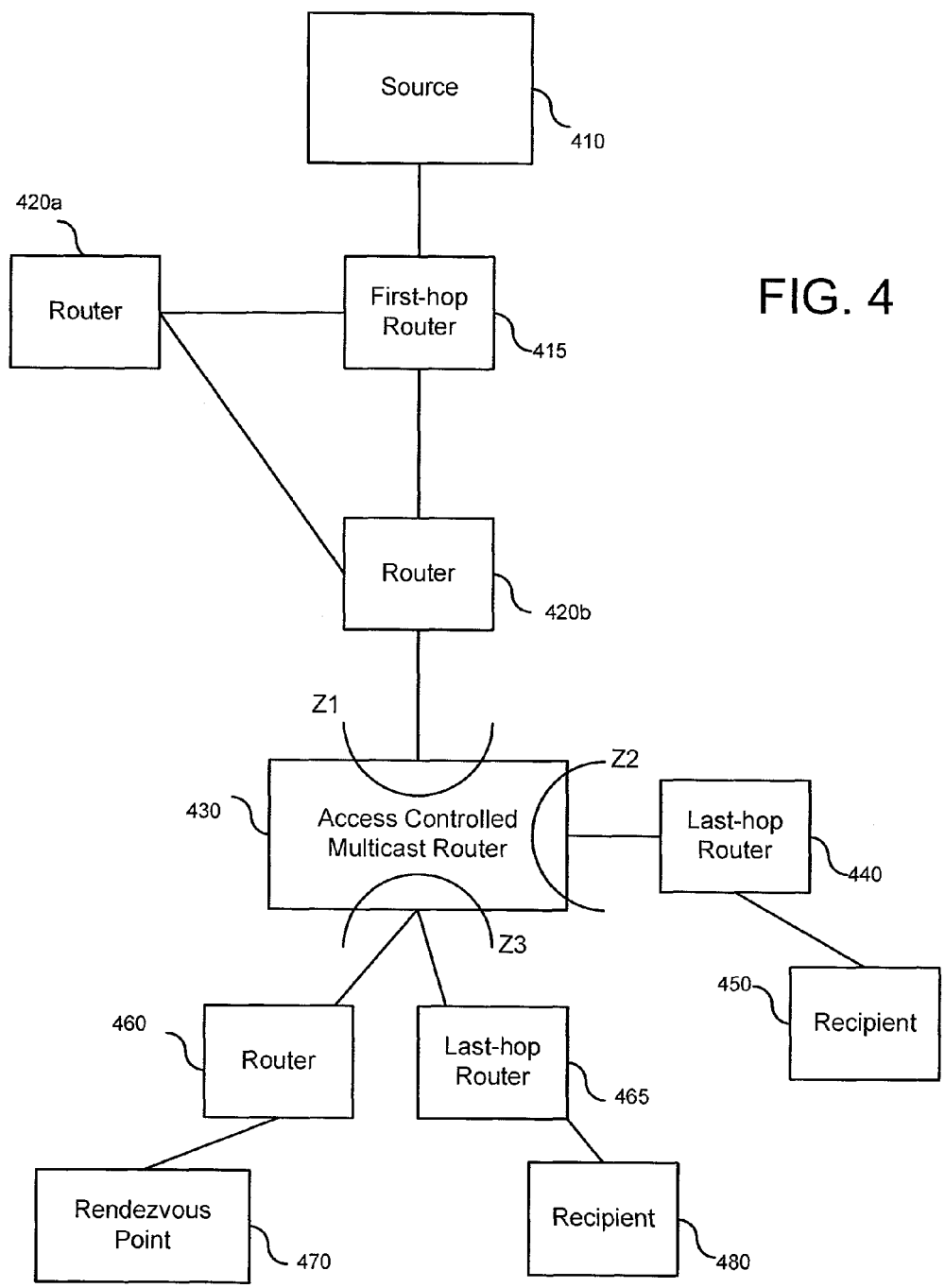
FIG. 4 is a schematic illustration of an alternative multicast system using zone based access control.

FIG. 4 illustrates another implementation of a multicast system in which a multicast source 410 and a rendezvous point 470 are located within different zones. In one implementation consistent with principles of the invention, the multicast system includes multicast source 410 coupled to an access controlled multicast router 430 through first-hop router 415 and intermediary routers 420a and 420b (collectively, "420"). Multicast access controlled router 430 provides an intersection between zones. Source 410, first-hop router 415, and intermediary routers 420 may be located within zone 1 (Z1). Multicast access controlled router 430 may be coupled to a multicast recipient 450 through a last-hop router 440 located within zone 2 (Z2). Zone 3 (Z3) may include rendezvous point 470 and a multicast recipient 480 that are coupled to a router 460 and a multicast recipient 480 coupled to a last-hop router 465. Routers 460 and last-hop router 465 may be coupled to access controlled multicast router 430. As a result, a media transmission from multicast source 410 to rendezvous point 470 passes from zone 1 to zone 3. Additionally, a media transmission from multicast source 410 to multicast recipient 450 initially passes from zone 1 to rendezvous point 470 in zone 3. The transmission may then be forwarded to multicast recipient 450 in zone 2.

Access controlled multicast router 430 may provide access controls for messages crossing zones in both the control plane and the data plane.

Figure 5:
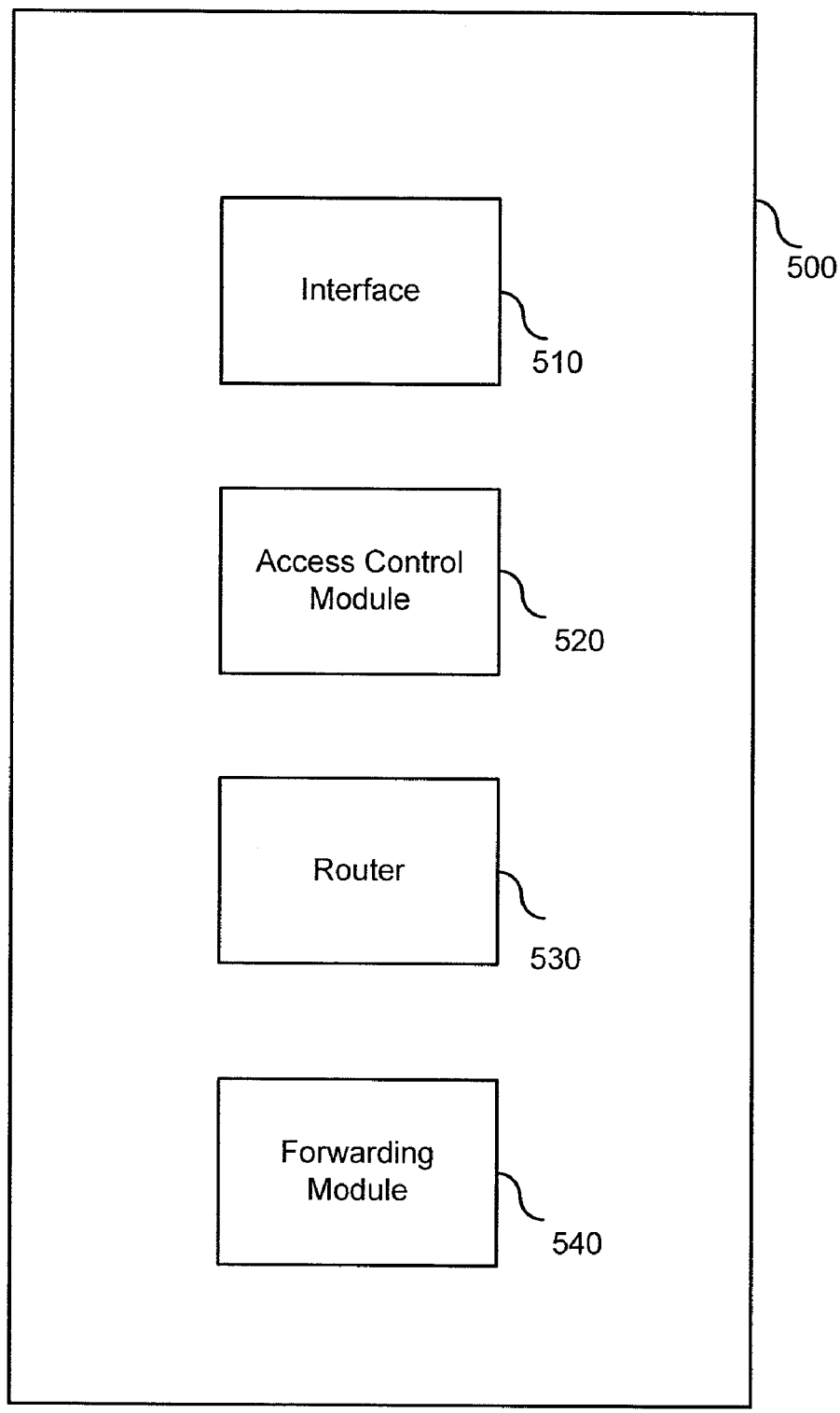
FIG. 5 is a functional block diagram of a multicast router.

FIG. 5 is a functional block diagram illustrating one implementation of an access controlled multicast router 500 consistent with principles of the invention. In FIG. 5, access controlled multicast router 500 may include an interface 510 for receiving and sending data such as multicast packets, an access control module 520, a router 530 for determining the path for outgoing data to follow, and a forwarding module 540 for computing how and where to send the outgoing data. Access control module 520 may determine whether or not to allow access to access control multicast router 500, including at the control plane. Additionally, access control module 520 may edit and forward multicast control announcements, for example, by editing source and destination information in PIM messages as may be necessary when a Network Address Translation boundary exists, or to accommodate overlapping addresses.

Figure 6:
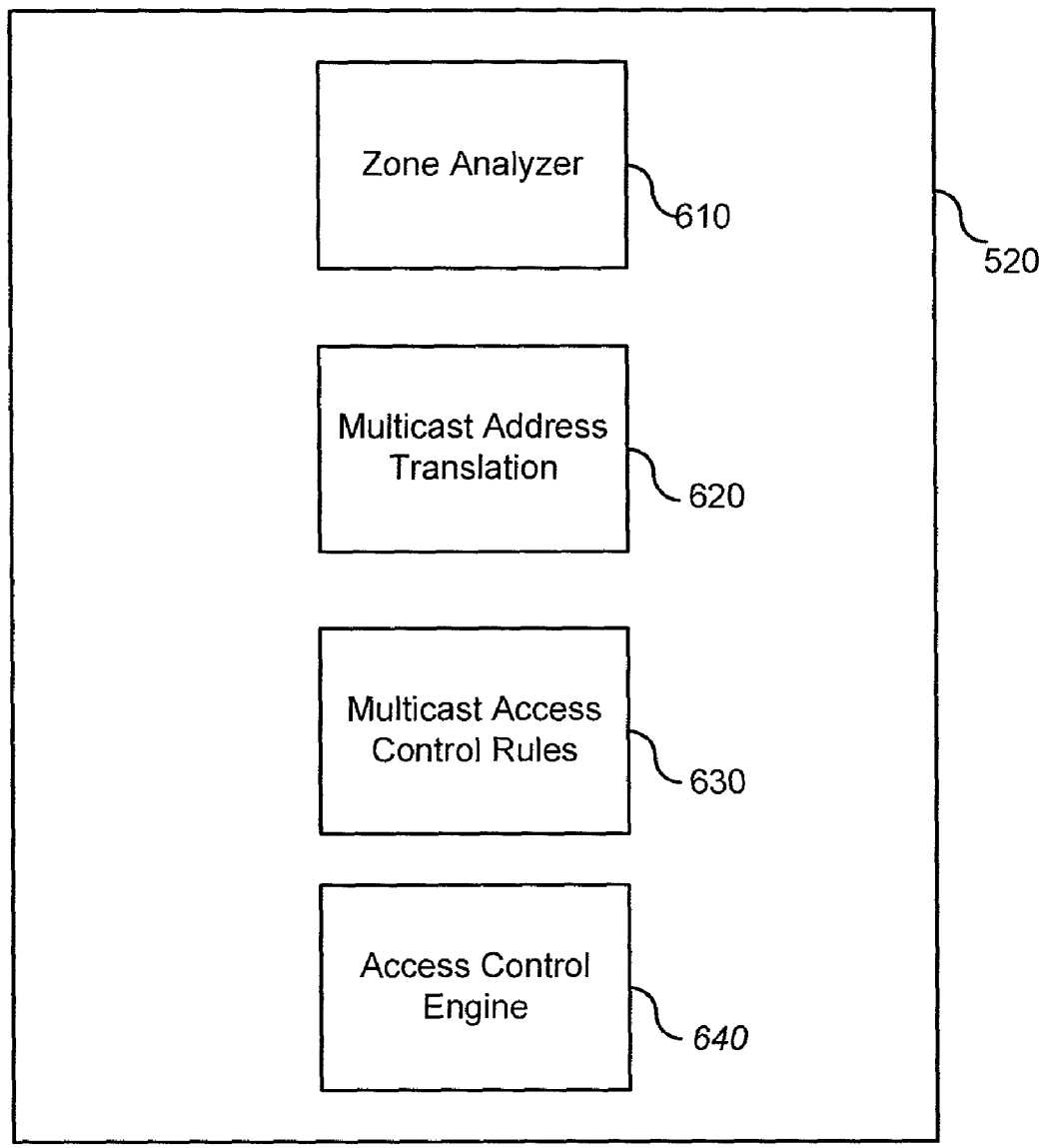
FIG. 6 is a functional block diagram of an access control component of a multicast router.

FIG. 6 is another functional block diagram illustrating one embodiment of access control module 520 including a zone analyzer 610, a multicast address translation module 620, multicast access control rules 630, and an access control engine 640. Zone analyzer 610 may be operable to determine the zones to which a message corresponds. For example, a message may have a source zone identifying where the message came from and a destination zone identifying where the message is going. In an implementation of zones in which all the members of a multicast group are within the same zone, the destination zone would be the zone encompassing all members of the multicast group. The multicast address translation module 620 may apply address translation at both the control plane and the data plane. For example, address translation module 620 may translate the sender address of a multicast control announcement when the sender has a private, and non-routable, address (e.g. 10.1.1.1). Additionally, multicast access control rules 630 may establish the specific access control policies. For example, multicast access control rules 630 may include a policy that allows messages to pass from zone 3 to zone 1 but not from zone 2 to zone 1. Access control engine 640 may be operable to determine which access control policies to apply to a particular message based on the results of the zone analysis performed by zone analyzer 610. Additionally, access control engine 640 may determine what, if any, address translation is to be performed by multicast address translation module 620.

Figure 7:
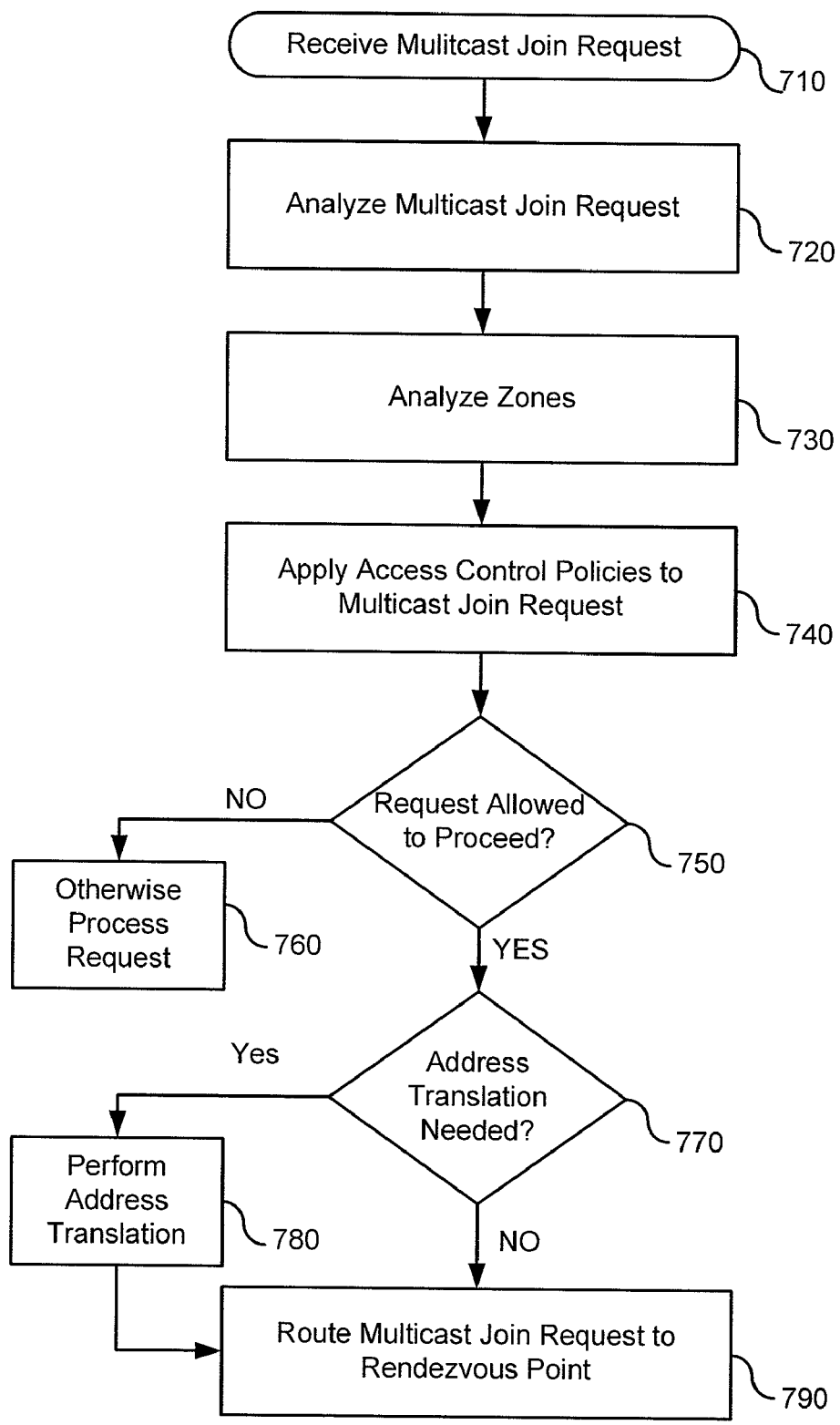
FIG. 7 is a flowchart illustrating a method of access control using a multicast router.

Referring now to FIG. 7, there is shown a process for enabling a multicast access controlled router, such as multicast access controlled router 360 of FIG. 3, to join a multicast recipient to a media transmission. In one implementation consistent with principles of the invention, access controlled multicast router 360 initially receives a multicast control announcement (act 710). In one embodiment, the multicast control announcement is a control plane message transmitted by a last hop router (e.g., last-hop routers 350a-350b and 340). For example, multicast recipient 380a, seeking participation in a media transmission, transmits a multicast control announcement through last-hop router 350a to rendezvous point 330. Since multicast last hop router 350a and rendezvous point 330 lie within different zones (zone 3 and zone 1, respectively), the multicast control announcement passes through access controlled multicast router 360.

Next, access controlled multicast router 360 analyzes the multicast control announcement and determines whether the multicast control announcement may be forwarded to rendezvous point 330 (act 720). Zone analyzer 610 (FIG. 6) then analyzes the zones of the multicast control announcement (act 730). In one implementation consistent with principles of the invention, zone analyzer 610 may examine the multicast control announcement to determine the source and recipient zones of the multicast control announcement. For example, the source zone of the multicast control announcement from multicast recipient 380a is zone 3. The destination zone for the multicast control announcement is zone 1 since rendezvous point 330 lies within zone 1.

After analysis of zones, access control engine 640 applies access control policies to the multicast control announcement (act 740). In one implementation, access control engine 640 uses the access control policies contained within multicast access control rules 630 applicable to the zones of the multicast control announcement as determined by zone analyzer 610. Next, access control engine 640 determines, as a result of the applied access control policy, whether the multicast control announcement is allowed to proceed through access controlled multicast router 360 (act 750). For example, an access control policy may permit multicast control announcements to be transmitted from zone 3 to zone 1 or, alternatively, the access control policy may deny multicast control announcements transmitted from zone 3 to zone 1. The access control policies may also be more focused. For example, an access control policy may indicate that multicast control announcements may be permitted from a first last-hop router 350a in zone 3 to router 320 in zone 1, but not from a second last-hop router 350b in zone 3 to router 320 in zone 1. Thus, different level of access control policies may be implemented. If the multicast control announcement is not allowed to continue to rendezvous point 330 based on application of the access control policies, then the multicast control announcement may be otherwise processed (act 760). Examples of suitable processing may include dropping the multicast control announcement, logging the request, and alarming the request.

If it is determined that the multicast control announcement is allowed to proceed to rendezvous point 330, access control engine 640 next determines whether address translation of the multicast control announcement is required (act 770). If address translation is required multicast address translation module 620 performs the address translation (act 780) and forwarding module 540 routes the multicast control announcement to the rendezvous point 330 (act 790). In one exemplary embodiment, multicast address translation module 620 may perform address translation or editing at the control plane based on an access control policy. If no address translation is required access controlled multicast router 360 routes the multicast control announcement to rendezvous point 330 (act 790).

Figure 8:
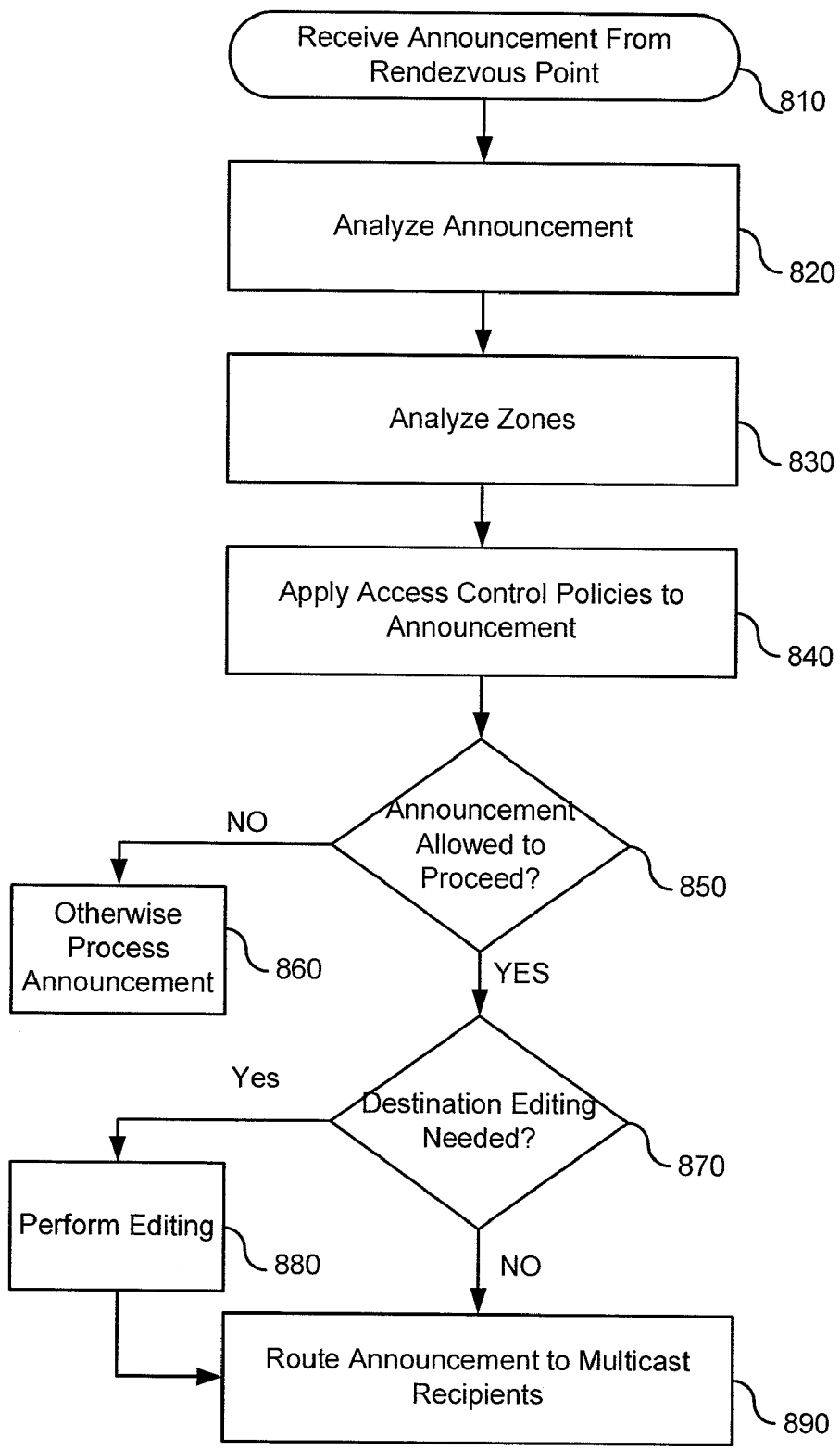
FIG. 8 is a flowchart illustrating an alternative method of access control using a multicast router.

FIG. 8 is a flow diagram illustrating an alternative implementation of a method for routing multicast requests consistent with principles of the invention. As shown in FIG. 8, when, for example, rendezvous point 330 includes a boot strap router (BSR), rendezvous point 330 may first announce a media transmission to the multicast recipients (e.g., multicast recipients 370 and 380a-380b). The multicast control announcement is then received from rendezvous point 330 by access controlled multicast router 360 (act 810). Rendezvous point 330 may then transmit the multicast control announcement to the multicast recipients using intermediary routers such as router 320. Since multicast recipients 370 and 380a-380b lie within different zones (zone 2 and zone 3) than rendezvous point 330 (zone 1), the multicast control announcement must pass through access controlled multicast router 360. Specifically, the multicast control announcement must pass from zone 1 to zone 2 in order to reach multicast recipient 370 and the multicast control announcement must to pass from zone 1 to zone 3 in order to reach multicast recipients 380a-380b.

Upon receipt of the multicast control announcement, access controlled multicast router 360 may analyze the multicast control announcement to determine whether the transmission may be forwarded to multicast recipients 370 and 380a-380b (act 820). The analysis of the multicast control announcement may include analyzing the zones of the multicast control announcement (act 830). Zone analyzer 610 examines the multicast control announcement to determine the source and destination zones of the multicast control announcement. For example, the source zone of the multicast control announcement from rendezvous point 330 is zone 1. The destination zones for the multicast control announcement are zones 2 and 3.

After zone analysis, access control engine 640 may apply access control policies to the multicast control announcement (act 840). Access control engine 640 may use the access control policies contained within multicast access control rules 630 applicable to the source and destination zones of the multicast control announcement as determined by zone analyzer 610. In one implementation consistent with principles of the invention, access control engine 640 may determine, as a result of the applied access control policy, whether multicast control the announcement is allowed to proceed through access controlled multicast router 360 (act 850). For example, an access control policy may permit multicast control announcements to be transmitted from zone 1 to zones 2 and 3 or the access control policy may deny multicast control announcements transmitted from zone 1 to zones 2 and 3. If it is determined that the multicast control announcement is not allowed to continue to last hop routers 340 and 350a-350b based on application of the access control policies, then the multicast control announcement may be otherwise processed (act 860). Examples of suitable processing may include dropping the multicast control announcement, logging the request and alarming the request. Alternatively, an access control policy may only permit the multicast control announcement to pass to some of the multicast recipients. For example, the access control policy may allow registration messages to pass from zone 1 to zone 3 but not from zone 1 to zone 2. As a result, the multicast control announcement may be forwarded to last-hop router 350a (or 350b) but not to last-hop router 340.

If it is determined in act 850 that the multicast control announcement is allowed to proceed to at least one of last-hop routers 340 and 350a-350b, access control engine 640 next determines whether address translation of the multicast control announcement is required (act 870). If address translation is required, multicast address translation module 620 may perform the address translation (act 880) and then route (i.e., using forwarding module 540) the multicast control announcement toward the allowed multicast recipients (act 890). For example, if the transmission is permitted from zone 1 to zone 2, either the source address or the destination (individual or group) address or both may be changed before the packet is released into zone 2. If it is determined that no address translation is required, access controlled multicast router 360 may route the multicast control announcement toward last-hop routers 340 and 350a-350b (act 890). It should be understood that, address translation may be performed independent of the transmission forwarding decision. For example, a transmission may not be allowed to proceed from zone 1 to zone 3, however address translation may still occur in forwarding the transmission from zone 1 to zone 2. Further, forwarding may be permitted to both zones 2 and 3 from zone 1 while performing unique address translation for each transmission into zones 2 and 3.

Figure 9:
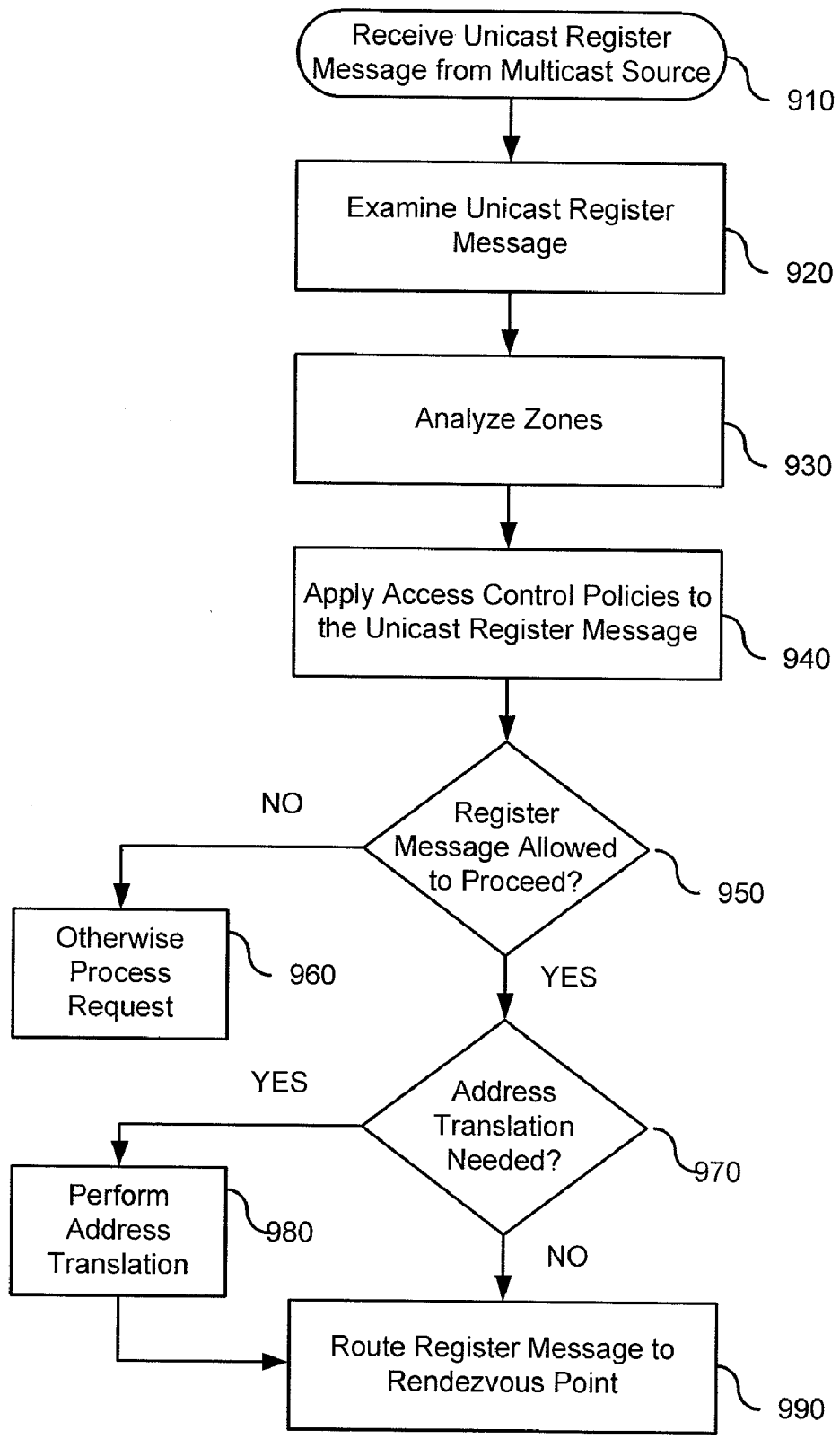
FIG. 9 is a flowchart illustrating an alternative method of access control using a multicast router.

FIG. 9 is another flow diagram illustrating a method for using an access controlled multicast router, such as access controlled multicast router 430, in a multicast system consistent with principles of the invention. As shown in FIG. 4, multicast source 410 and rendezvous point 470 are in different zones. Initially, access controlled multicast router 430 receives a multicast control announcement which was triggered by multicast source 410 sending multicast packets toward first-hop router 415 (act 910). The multicast control announcement may be transmitted by first-hop router 415 and intermediary routers 420 to rendezvous point 470. However, since multicast source 410 is located within zone 1 and rendezvous point 470 is located within zone 3, the multicast control announcement must pass through access controlled multicast router 430 in order to pass from zone 1 to zone 3.

Accordingly, access controlled multicast router 430 next analyzes the multicast control announcement to determine whether the multicast control announcement may be forwarded to rendezvous point 470 (act 920). One implementation of this analysis may include analyzing the zones of the multicast control announcement (act 930). More specifically, zone analyzer 610 may examine the multicast control announcement to determine the source and destination zones of the multicast control announcement. For example, the source zone of the multicast control announcement from multicast source 410 is zone 1. The destination zone for the multicast control announcement is zone 3, since rendezvous point 470 lies within zone 3.

After zone analysis, access control engine 640 may apply access control policies to the multicast control announcement (act 940). In one implementation consistent with principles of the invention, access control engine 640 may use the access control policies contained within multicast access control rules 630 applicable to the zones of the multicast control announcement as determined by zone analyzer 610. Next, access control engine 640 may determine, based on application of the access control policies, whether the multicast control announcement is allowed to proceed through access controlled multicast router 430 (act 950). For example, an access control policy may permit multicast control announcements to be transmitted from zone 1 to zone 3 or the access control policy may deny multicast control announcements transmitted from zone 1 to zone 3, but allow multicast control announcements from zone 1 to zone 2. As described above, the access control policies may also be more focused. For example, an access control policy may indicate that multicast control announcements may be permitted from router 420a or 420b in zone 1 toward a first router 460 in zone 3, but not from router 420a or 420b in zone 1 toward a last-hop router 465 in zone 3. If it is determined that the multicast control announcement is not allowed to continue to rendezvous point 470 based on application of the access control policies, then the multicast control announcement may be otherwise processed (act 960). As above, suitable processing may include dropping the multicast control announcement, logging the request, and alarming the request.

However, if it is determined in act 950 that the multicast control announcement is allowed to proceed to rendezvous point 470, access control engine 640 next determines whether address translation of the multicast control announcement is required (act 970). In one implementation consistent with principles of the invention, if address translation is required the address translation module 620 may perform the address translation (act 980). More specifically, address translation may be applied to the source address, the destination address or addresses, or both. The multicast control announcement may then be routed to rendezvous point 470 (act 990). However, if it is determined in act 970 that no address translation is required, access controlled multicast router 430 routes the multicast control announcement to rendezvous point 470 (act 990).

In an alternative implementation, a multicast system may include more than one domain. The devices within one domain may be privately addressed so as to be invisible or inaccessible to devices lying outside of the domain. For example, a rendezvous point within a domain using private addresses may be inaccessible to last-hop routers seeking access to a media transmission. Alternatively, the rendezvous point within a domain may lie behind a security device such as a firewall that operates to prevent external access to devices lying behind the firewall. In order to facilitate media transmissions, a proxy rendezvous point may be provided that may be included in an access controlled multicast router to perform the functions of the inaccessible rendezvous point for external domains. The proxy rendezvous point may provide a way to represent the rendezvous point to other domains without allowing direct access to the rendezvous point. Direct access to the rendezvous point may be prevented because the rendezvous point lies within a private network and thus has an invisible IP address or because of a security device, such as a firewall, that implements a policy which prevents external access.

Figure 10:
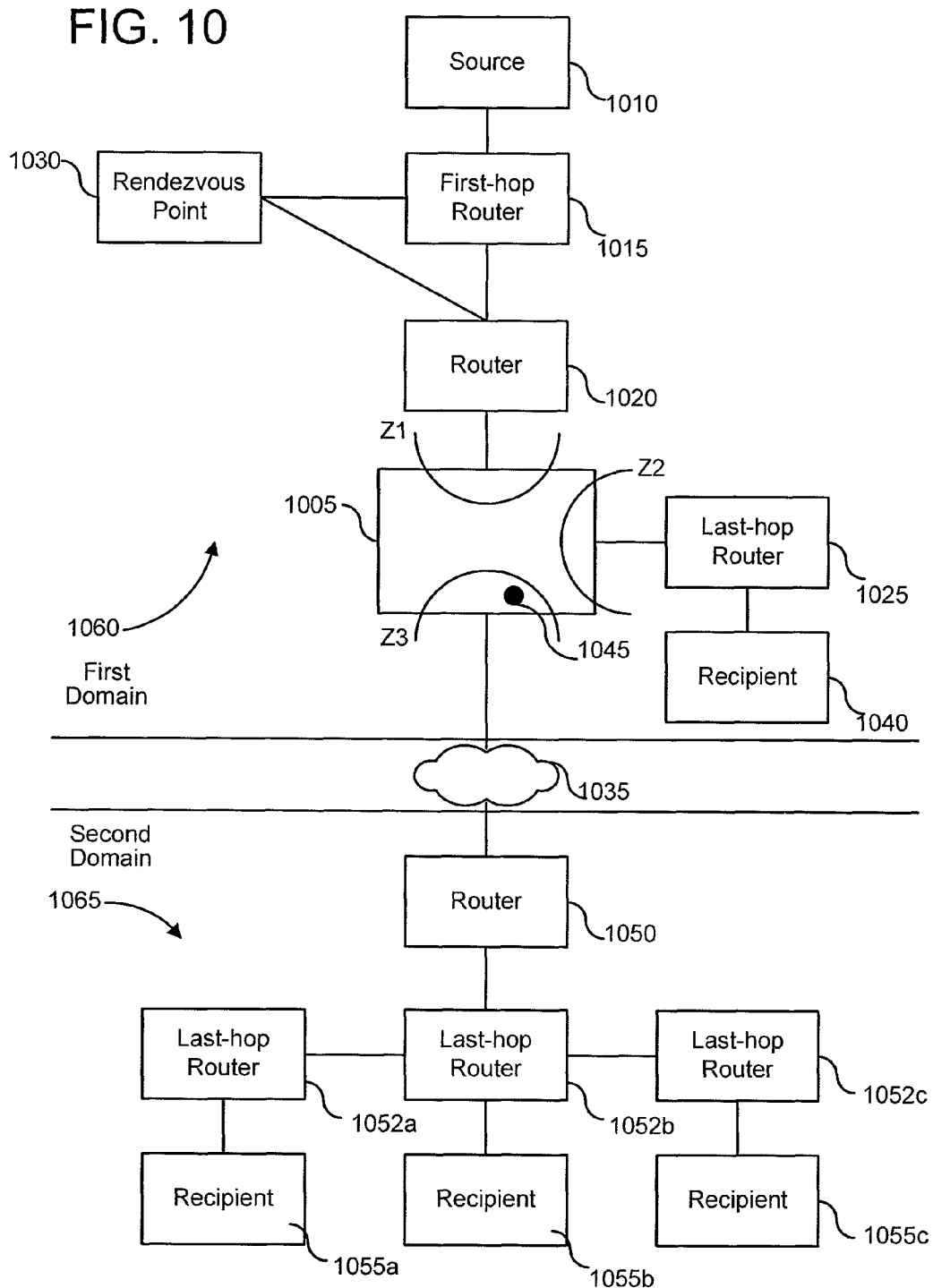
FIG. 10 is a schematic illustration of an alternative multicast system providing a proxy rendezvous point.

FIG. 10 is a block diagram illustrating an alternative multicast system including two domains and a proxy rendezvous point. In one implementation consistent with principles of the invention, the multicast system may include a first domain 1060 and a second domain 1065. Additionally, a network 1035, such as the Internet or another network such as MBone, may lie between the domains. In one embodiment, first domain 1060 may include a multicast source 1010 coupled to a rendezvous point 1030 through an intermediary router 1020 and a first-hop router 1015. An access controlled multicast router 1005 may provide an intersection between zones. Zone 1 (Z1) may include multicast source 1010, rendezvous point 1030, first-hop router 1015, and intermediary router 1020. Zone 2 (Z2) may include a last-hop router 1025 and a multicast recipient 1040. Zone 3 (Z3) may include intermediary router 1050, last-hop routers 1052*a*-1052*c* (collectively, "1052"), and multicast recipients 1055*a*-1055*c* (collectively, "1055") located within second domain 1065. Additionally, a proxy rendezvous point 1045 within access controlled multicast router 1005 may be provided within zone 3. Communication between last hop routers 1052*a*-1052*c* and rendezvous point 1030 passes between zones 1 and 3 as well as between first domain 1060 and second domain 1065.

Figure 11:
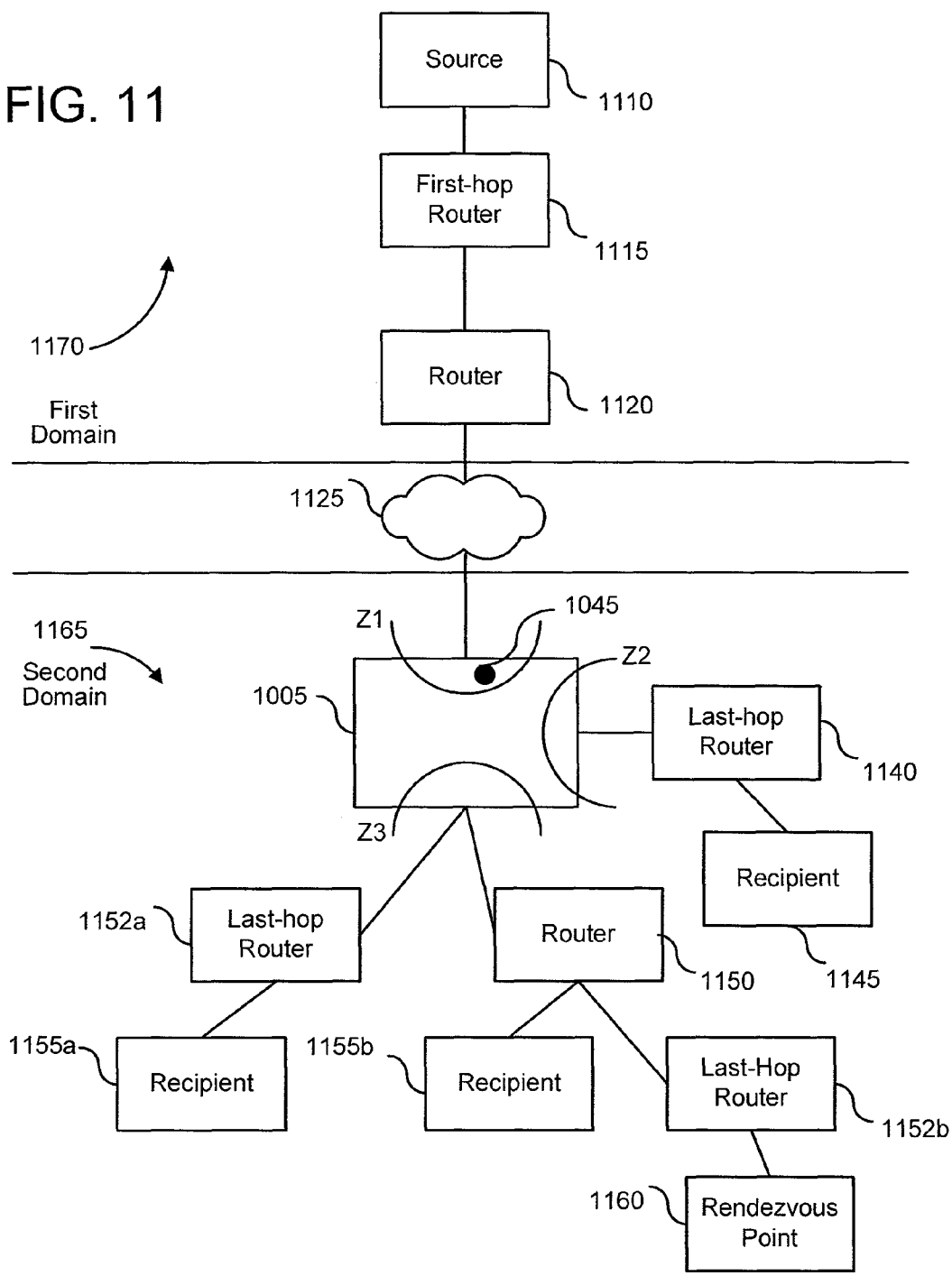
FIG. 11 is a schematic illustration of an alternative multicast system providing a proxy rendezvous point.

FIG. 11 is a block diagram illustrating an alternative multicast system having two domains. In one implementation consistent with principles of the invention, the multicast system may include a first domain 1170 and a second domain 1165. A network 1125, such as the Internet, may lie between the domains. Additionally, second domain 1165 may include an access controlled multicast router 5 that serves as an intersection between zones. Zone 1 (Z1) may include a first-hop router 1115, a router 1120, and a multicast source 1110 located within first domain 1170. Additionally, zone 1 may include a proxy rendezvous point 1045 within access controlled multicast router 1005. Zone 2 (Z2) may include a multicast recipient 1145 coupled to access controlled multicast router 1005 through a last-hop router 1140. Zone 3 (Z3) may include router 1150, last-hop routers 1152*a*-1152*b* (collectively, "1152"), as well as multicast recipients 1155*a*-1155*b* (collectively, "1155") and a rendezvous point 1160. A multicast control announcement from multicast source 1110 passes between first domain 1170 and second domain 1165, as well as between zone 1 and zone 3 in order to reach rendezvous point 1160.

Figure 12:
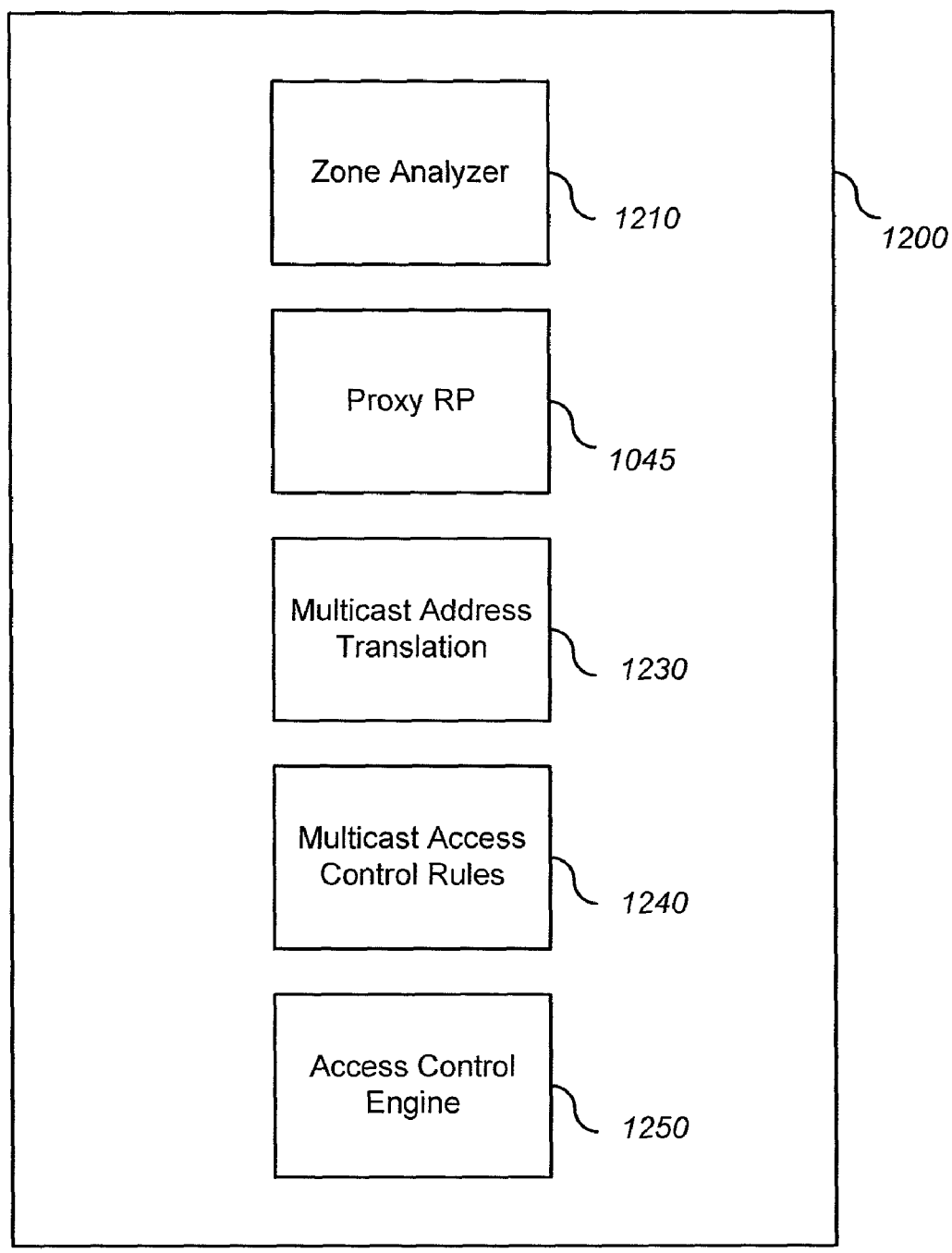
FIG. 12 is functional block diagram of an access control component of a multicast router including a proxy rendezvous point.

FIG. 12 is a functional block diagram showing an access control module 1200 included within access controlled multicast router 1005. In one implementation consistent with principles of the invention, access control module 1200 may include a zone analyzer 1210, a proxy rendezvous point (RP) 1045, a multicast address translation module 1230, a multicast access control rules 1240, and an access control engine 1250. In one implementation, zone analyzer 1210, multicast access control rules 1240, and access control engine 1250 may function as described above with respect to FIG. 6. Furthermore, in an exemplary implementation, proxy rendezvous point 1045 appears, to external domains, to be a rendezvous point having a location within the access controlled multicast router 1005. Accordingly, proxy rendezvous point 1045 may perform the functions of a rendezvous point for devices lying within external domains without allowing direct access to the rendezvous point that lies within a domain.

Figure 13:
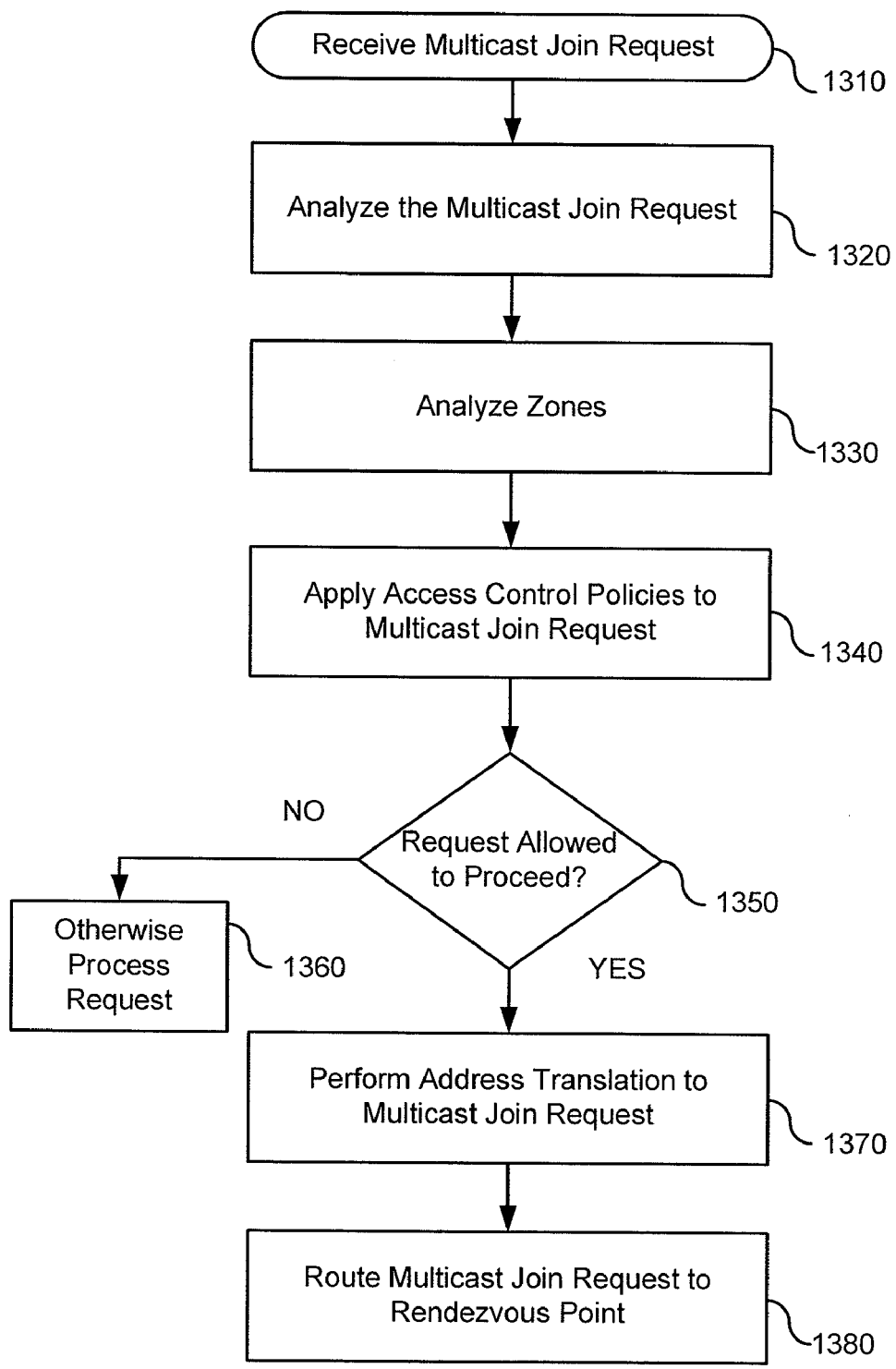
FIG. 13 is a flowchart illustrating a method of access control using a multicast router including a proxy rendezvous point.

FIG. 13 is a flow diagram illustrating one implementation for using multicast access controlled router 1005 of FIG. 10 to join a multicast recipient to a media transmission. In one implementation consistent with principles of the invention, access controlled multicast router 1005 initially receives a multicast control announcement (act 1310). In one exemplary embodiment, the multicast control announcement may be a control plane message transmitted by a downstream multicast router (e.g., multicast router 1050). For example, multicast recipient 1055*a* seeks participation in a media transmission signaling to last-hop router 1052*a* using a protocol like IGMP. Last hop router 1052*a*, in turn, transmits a join request toward proxy rendezvous point 1045 lying within access controlled multicast router 1005. To multicast routers 1050 and 1052*a*, proxy rendezvous point 1045 appears to be rendezvous point 1030. However, actual rendezvous point 1030 may be privately addressed (e.g., 10.10.10.10) and thus otherwise invisible to the outside network. Conversely, proxy rendezvous point 1045 has an externally visible IP address (e.g., 1.1.1.1.) and so appears to be the rendezvous point to external routers 1050 and 1052*a*.

Next, access controlled multicast router 1005 analyzes the multicast control announcement to determine whether the multicast control announcement may be forwarded to rendezvous point 1030 (act 1320). In one implementation consistent with principles of the invention, multicast control announcement analysis may include analyzing the zones of the multicast control announcement (act 1330). More specifically, zone analyzer 1210 may examine the multicast control announcement to determine the source and destination zones. For example, say the source zone of the multicast control announcement from last hop router 1052*a* is zone 3. The destination zone for the multicast control announcement appears to be zone 3 since the target destination is proxy rendezvous point 1045 located within zone 3. However, for the purposes of analysis, since access controlled multicast router 1005 is to forward the multicast control announcement to rendezvous point 3010, the destination zone is considered to be zone 1 where rendezvous point 1030 lies.

After analysis of zones, access control engine 1250 applies access control policies to the multicast control announcement (act 1340). In one implementation, access control engine 1250 uses the access control policies contained within multicast access control rules 1240 applicable to the zones of the multicast control announcement as determined by zone analyzer 1210. Access control engine 1250 then determines, based on applied access control policies, whether the multicast control announcement is allowed to proceed through access controlled multicast router 1005 (act 1350). For example, an access control policy may permit multicast control announcements to be transmitted from zone 3 to zone 1 or the access control policy may deny multicast control announcements transmitted from zone 3 to zone 1. Alternatively, multicast control announcements may be permitted from zone 3 to zone 1 but only for specific multicast groups at specific times. If the multicast control announcement is not allowed to continue to rendezvous point 1030 based on application of the access control policies, then the multicast control announcement may be otherwise processed (act 1360). Otherwise processing may include dropping the multicast control announcement, logging the request and alarming the request.

If it is determined in act 1350 that the multicast control announcement is allowed to proceed to rendezvous point 1030, the multicast address translation module 1230 performs address translation on the multicast control announcement to point the multicast control announcement to rendezvous point 1030 (act 1370). In one implementation consistent with principles of the invention, multicast address translation module 1230 edits the control plane multicast control announcement to replace proxy rendezvous point 1045 destination address with the internal address of rendezvous point 1030 (e.g., changing 1.1.1.1 to 10.10.10.10). Additionally, if the access control policy is designed to do so, the source of the multicast control announcements may be edited so that the source appears to be from the proxy rendezvous point (e.g., 1.1.1.1). Thus, rendezvous point 1030 will route the media transmission to the proxy rendezvous point 1045 which may then proxy the transmission to the multicast recipients. The access controlled multicast router 1005 may then route the multicast control announcement to the rendezvous point 1030 (act 1380).

Figure 14:
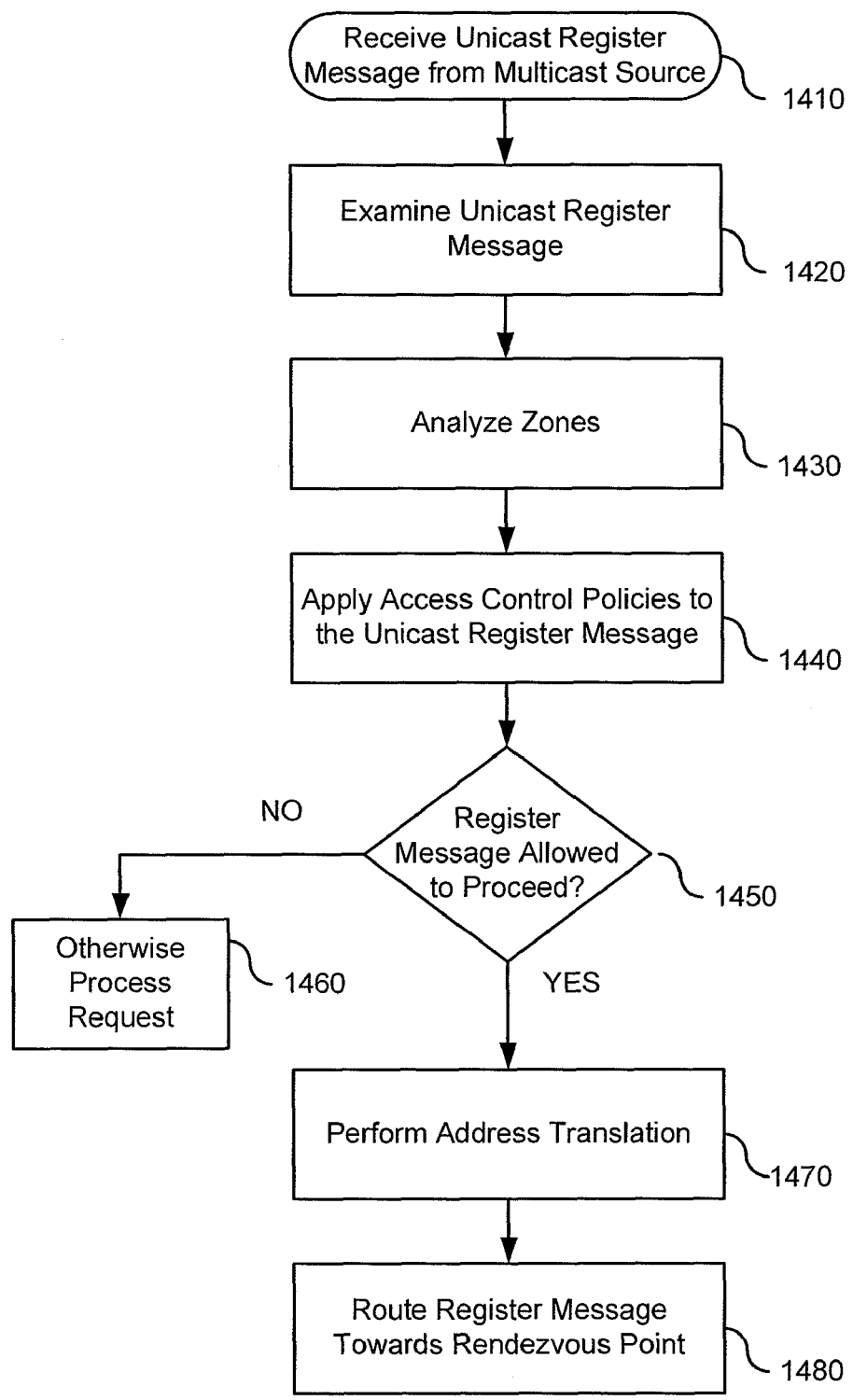
FIG. 14 is a flowchart illustrating an alternative method of access control using a multicast router including a proxy rendezvous point.

FIG. 14 is a flow diagram illustrating another implementation of a method for using an access controlled multicast router 1005 in a multicast system as illustrated in FIG. 11 in which the multicast source 1110 and the rendezvous point 1160 are in different domains. Initially, access controlled multicast router 1005 receives a multicast control announcement from multicast source 1110 (act 1410). In one embodiment, the multicast control announcement is transmitted by multicast source 1110 through first-hop router 1115 and router 1120 to proxy rendezvous point 1045 lying within access controlled multicast router 1005. To first-hop router 1115 and router 1120, proxy rendezvous point 1045 appears to be rendezvous point 1160. However, since the real rendezvous point 1160 is privately addressed (e.g., 10.10.10.10) and thus invisible to first-hop router 1115 and router 1120. Proxy rendezvous point 1045 has an externally visible IP address (e.g., 1.1.1.1.) and so appears to be the rendezvous point to external router 1120 and first-hop router 1115.

Next, access controlled multicast router 5 may analyze the multicast control announcement to see if the multicast control announcement may be forwarded to rendezvous point 1160 (act 1420). This analysis may include analyzing the zones of the multicast control announcement (act 1430). Zone analyzer 610 next examines the multicast control announcement to determine the source and destination zones of the multicast control announcement. For example, the source zone of the multicast control announcement from multicast source 1110 is zone 1. The destination zone for the multicast control announcement appears to also be zone 1 since the target destination was proxy rendezvous point 1045 lying in zone 1. However, since access controlled multicast router 5 may forward the unicast register message to rendezvous point 1160, the destination zone is set to zone 3 where rendezvous point 1160 lies.

After zone analysis, access control engine 1250 applies access control policies to the multicast control announcement (act 1440). In one implementation consistent with principles of the invention, access control engine 1250 may use the access control policies contained within multicast access control rules 1240 applicable to the zones of the multicast control announcement as determined by zone analyzer 1210. Next, access control engine 1250 determines, based on the applied access control policies, if the multicast control announcement is allowed to proceed through the access controlled multicast router 1005 (act 1450). For example, an access control policy may permit multicast control announcements to be transmitted from zone 1 to zone 3 or the access control policy may deny multicast control announcements transmitted from zone 1 to zone 3, but allow multicast control announcements from zone 1 to zone 2. If the multicast control announcement is not allowed to continue to rendezvous point 1160 based on application of the access control policies, then the multicast control announcement may be otherwise processed (act 1460). Examples of suitable processing may include dropping the multicast control announcement, logging the request, and alarming the request. Proxy rendezvous point 1045 continues to act as the rendezvous point 1160 in zone 1, even if a multicast control announcement is not allowed to continue towards the rendezvous point 1160.

If it is determined in act 1450 that the multicast control announcement is allowed to proceed to rendezvous point 1160, multicast address translation module 1230 performs address translation on the multicast control announcement (act 1470). The destination is changed from proxy rendezvous point 45 to rendezvous point 1160 (e.g., changing the IP address from 1.1.1.1 to 10.10.10.10). Alternatively, the source may also be changed to reflect a source location on access controlled multicast router 500 located within zone 3 (e.g., 10.1.1.1). As a result, the sender of the unicast message would appear to rendezvous point 1160 to be 10.1.1.1. Thus, access controlled multicast router 5 using proxy rendezvous point 1045 will appear to be the source of the media transmission to rendezvous point 1160. Next, access controlled multicast router 430 may route the multicast control announcement to rendezvous point 1160 (act 1480).

The previous implementations described multicast systems having two domains. However, more than two domains may be included within a multicast system. The access controlled multicast router and proxy rendezvous point function the same with more than two domains as with two domains.

The invention and all of the functional operations described herein may be implemented in digital electronic circuitry, or in computer hardware, firmware, software, or in combinations of them. The invention may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps of the invention may be performed by one or more programmable processors executing a computer program to perform functions of the invention by operating on input data and generating output. Method steps may also be performed by, and apparatus of the invention may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

The invention may be implemented in a computing system that includes a back-end component, e.g., as a data server, or that includes a middleware component, e.g., an application server, or that includes a front-end component, e.g., a client computer having a graphical user interface or a Web browser through which a user may interact with an implementation of the invention, or any combination of such back-end, middleware, or front-end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

Moreover, while series of acts have been described with regard to FIGS. 7-9, 13, and 14 the order of the acts may be varied in other implementations consistent with the present invention. In addition, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A system comprising:
a network device that intersects a plurality of zones of a network, the network device to:
receive data from another network device located in a source zone, of the plurality of zones, associated with a first domain, the received data being destined for a plurality of multicast recipients, the plurality of multicast recipients being located in one or more destination zones, of the plurality of zones, associated with a different second domain, where the one or more destination zones are different than the source zone,
analyze the received data to identify the source zone and the one or more destination zones,
apply one or more access control rules to the received data based on the identified source zone and the identified one or more destination zones,
determine whether the one or more access control rules permit routing of the received data to the one or more destination zones, and
route, using a proxy rendezvous point in the network device, the received data to the plurality of multicast recipients when the one or more access control rules permit routing of the received data to the one or more destination zones, where the proxy rendezvous point, located in the first domain, is associated with the second domain and functions as a rendezvous point for the one or more destination zones.

2. The system of claim 1, where the network device is further to:
receive other data from the other network device, the other data being destined for particular multicast recipients, the particular multicast recipients being located in another destination zone associated with a third domain, where the other destination zone is different than the source zone and the one or more destination zones,
analyze the other data to identify the source zone and the other destination zone,
apply the access control rules to the other data based on the identified source zone and the identified other destination zone,
determine that the access control rules do not permit routing of the other data to the identifier other destination zone, and
drop the other data based on the determination that the access control rules do not permit routing of the other data to the identified other destination zone.

3. The system of claim 1, further comprising:
a particular rendezvous point, located in the second domain, via which the received data is routed to the plurality of multicast recipients; and where, when routing the received data to the plurality of multicast recipients, the network device is further to:
perform multicast address translation on the received data, where performing the multicast address translation includes at least one of:
replacing a first source address associated the other network device with a second source address associated with the proxy rendezvous point, and
replacing a first destination address associated with the proxy rendezvous point with a second destination address associated with the particular rendezvous point.

4. The system of claim 3, where replacing the first source address with the second source address causes the other network device to appear, to the particular rendezvous point, as the proxy rendezvous point.

5. The system of claim 3, where replacing the first destination address with the second destination address causes the proxy rendezvous point to appear, to the plurality of multicast recipients, as the particular rendezvous point.

6. The system of claim 1, where the proxy rendezvous point, associated with the second domain, is located in the source zone.

7. The system of claim 1, where the plurality of multicast recipients are not accessible by the other network device.

8. The system of claim 1, where the other network device is not accessible to the second domain.

9. A system comprising:
a network device, associated with a first domain, that intersects a plurality of zones of a network, the network device to:
receive data from a source network device located in a source zone, of the plurality of zones, associated with the first domain, the received data being destined for a plurality of multicast recipients being located in a first destination zone, of the plurality of zones, associated with the first domain or a second destination zone, of the plurality of zones, associated with a different second domain,
analyze the received data to identify the source zone and at least one of the first destination zone or the second destination zone, based on access control rules, to determine whether to permit routing of the received data to the at least one of the first destination zone or the second destination zone,
route, using a rendezvous point, the received data to one or more of the plurality of multicast recipients, located in the first destination zone, when the access control rules permit the routing of the received data, and
route, using a proxy rendezvous point located within the network device and in the first domain, the received data to another one or more of the plurality of multicast recipients, located in the second destination zone, when the access control rules permit the routing of the received data,
where the proxy rendezvous point functions as the rendezvous point for the second domain.

10. The system of claim 9, where the network device is further to:
receive other data from the source network device, the other data being destined for particular multicast recipients, the particular multicast recipients being located in another destination zone, of the plurality zones, where the other destination zone is different than the source zone,
analyze the received data to identify the source zone and the other destination zone based on the access control rules to determine whether to permit routing of the other data, and
drop the other data based on the determination that the access control rules do not permit the routing of the other data.

11. The system of claim 9, where, when routing the received data to the other one or more of the plurality of multicast recipients, the network device is further to:
perform multicast address translation on the received data that includes replacing a first source address associated the source network device with a second source address associated with the proxy rendezvous point.

12. The system of claim 11, where the second source address causes the proxy rendezvous point to appear, to the other one or more multicast recipients, to be a device located in the source zone from which the received data was transmitted.

13. The system of claim 9, where a device that is within the first domain is privately addressed so as to be invisible or inaccessible to a device that is not located within the first domain.

14. The system of claim 9, where the proxy rendezvous point is located in the first domain and is associated with the second destination zone.

15. The system of claim 9, where the other one or more of the plurality of multicast recipients are not accessible by the source network device.

16. A method performed by a network device that intersects a plurality of zones of a network, the method comprising:
receiving, by the network device, data from another network device located in a source zone, of the plurality of zones, associated with a first domain, the received data being destined for a plurality of multicast recipients, the plurality of multicast recipients being located in one or more destination zones, of the plurality of zones, associated with a different second domain, where the one or more destination zones are different than the source zone;
analyzing, by the network device and using access control rules obtained from a memory associated with network device, the received data to identify the source zone and the one or more destination zones to determine whether to permit routing of the received data; and
routing, using a proxy rendezvous point located within the network device, the received data to the plurality of multicast recipients when the access control rules permit routing of the received data, where the proxy rendezvous point, located in the first domain, is associated with the second domain and functions as a rendezvous point for the one or more destination zones.

17. The method of claim 16, further comprising:
receiving, from the other network device, other data that is destined for particular multicast recipients, the particular multicast recipients being located in one or more other destination zones, of the plurality zones, where the one or more other destination zones is different than the source zone;
analyzing the other data to identify the source zone and the other one or more destination zones based on the access control rules to determine whether to permit routing of the other data; and
processing the other data based on the determination that the access control rules do not permit the routing of the other data, where processing the other data includes at least one of dropping the other data or logging the other data.

18. The method of claim 16, further comprising:
performing address translation, on the received data by replacing one or more destination addresses, associated with the received data, with private addresses associated with the plurality of multicast recipients, where the private addresses are not accessible by the other network device.

19. The method of claim 16, where routing the received data to the plurality of multicast recipients further includes:
proxying the received data between the source zone associated with the first domain and the one or more destination domains associated with the second domain.

20. The method of claim 16, where routing the received data to the plurality of multicast recipients further includes:
proxying the received data between the plurality of multicast recipients associated with the second domain and the other network device associated with the first domain.

21. A multicast access control apparatus that intersects a plurality of zones, the multicast access control apparatus comprising:
a memory to store a plurality of access control policies;
a proxy rendezvous point to receive an incoming message intended for a rendezvous point, the proxy rendezvous point appearing as rendezvous point to a sender of the incoming message;
an analyzer to analyze the incoming message to identify a source zone, in which the incoming message originated, and a destination zone, to which the incoming message is to be sent;
an access control engine to apply an access control policy, of the plurality of access control policies in the memory, to the incoming message, based on the source zone and the destination zone, to determine whether to send the incoming message to the rendezvous point; and
an address translation module to perform address translation on the incoming message to include an address of the rendezvous point to permit the incoming message to be sent to the rendezvous point when the access control policy indicates that the incoming message can be sent to the rendezvous point,
where the proxy rendezvous point, located in the source zone of a first domain, is further to receive a media transmission from the rendezvous point destined for zones of a different second domain, in response to sending the incoming message to the rendezvous point, and proxy the media transmission to a recipient based on the applied access control policies.

22. The apparatus of claim 21, wherein the address translation module is to edit one or more destination addresses or group addresses of a plurality of destination addresses or group addresses of the incoming message.

23. The apparatus of claim 21, where the access control engine drops a particular incoming message when a particular access control policy, of the plurality of access control policies, indicate that the particular incoming message is not be sent to the rendezvous point.

* * * * *